Feb. 12, 1963     A. R. EARNSHAW ET AL     3,077,189
DIESEL ENGINE CONVERTED INTO A TWO-CYCLE GAS ENGINE
Filed May 13, 1960     3 Sheets-Sheet 1

INVENTORS
ALVIN R. EARNSHAW
CHARLES T. WHITNEY, SR.
BY Munn & Liddy
ATTORNEYS

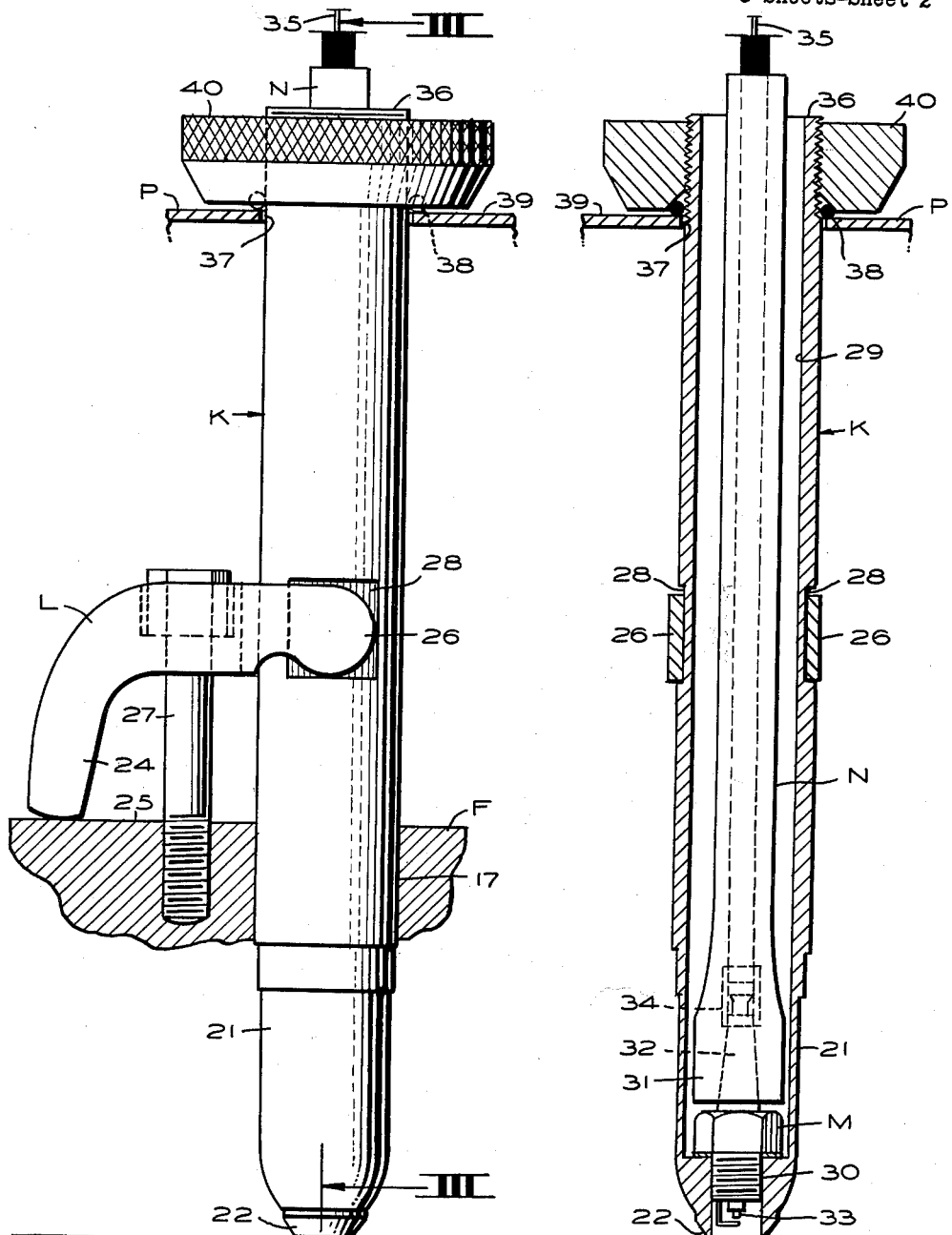

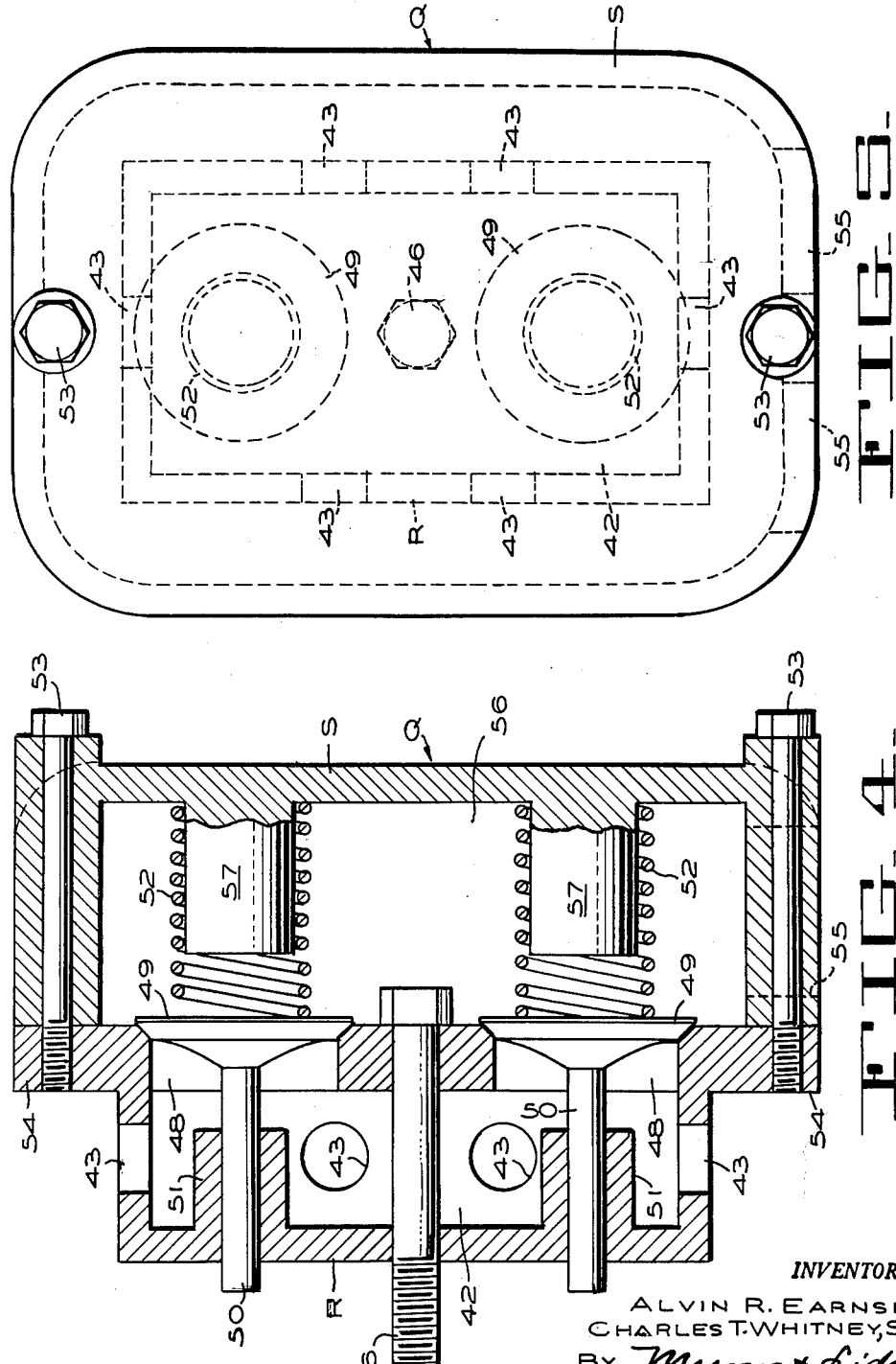

United States Patent Office 3,077,189
Patented Feb. 12, 1963

3,077,189
DIESEL ENGINE CONVERTED INTO A TWO-CYCLE GAS ENGINE
Alvin R. Earnshaw, 611 Woodrow Ave., Oildale, Calif., and Charles T. Whitney, Sr., 7300 Downing Ave., Bakersfield, Calif.
Filed May 13, 1960, Ser. No. 28,990
2 Claims. (Cl. 123—65)

The present invention relates to improvements in a diesel engine converted into a two-cycle gas engine. It consists of the combinations, constructions, and arrangement of parts, as hereinafter described and claimed.

It is common practice at the present time to employ diesel engines in oil fields during drilling operations. These engines are costly and are rather expensive in operation, even though they are run on diesel fuel. On the other hand, there is an abundant supply of natural gas available in the oil fields usually without cost to the drillers.

As a cardinal object of our invention, it is proposed to modify a diesel engine, with the minimum of additional parts, so that it may be operated as a two-cycle gas engine, utilizing natural gas as the fuel. The modified engine may be readily reconverted to a diesel.

It is a well known fact that a blower is provided to force air into the cylinders for scavenging the exhaust gases and to supply the cylinders with fresh air for compression. As the pistons continue on their upward stroke, the exhaust valves close, and the fresh air is trapped and compressed. Shortly before each piston reaches its highest point, the required amount of diesel fuel is sprayed into the combustion space by a fuel injector. The intense heat generated during the high compression of the air will ignite the fine fuel spray immediately, forcing the piston downward on its power stroke.

Accordingly, the objects of our inventions embrace: (1) to reduce the compression ratio of the cylinders to a point where a mixture of air and natural gas may be utilized in the cylinders, without danger of pre-ignition of the mixture during the compression thereof; (2) to utilize spark plugs for positively igniting the mixture at the proper time, these spark-plugs being carried by adapter tubes that are mounted in the same bores from which the fuel injectors have been removed; and (3) to provide a blower box pressure relief apparatus, which is designed to open and release pressure to the atmosphere, in case of a backfire into the supercharger blower that furnishes the mixture of air and natural gas to the cylinders.

Other objects and advantages will appear as the specification continues. The novel features of the invention will be set forth in the claims hereunto appended.

Drawings

For a better understanding of the invention, reference should be had to the accompanying drawings, forming part of this specification, in which:

FIGURE 2 is an elevational view of the spark-plug adapter tube, and illustrating the manner in which it is held in a bore in a cylinder head from which a fuel injector has been removed;

FIGURE 3 is a vertical sectional view taken along the plane III—III of FIGURE 2;

FIGURE 4 is a vertical sectional taken through the blower box pressure relief apparatus; and FIGURE 5 is an end elevational view of FIGURE 4, looking at the right-hand end of the latter.

Figure 1:
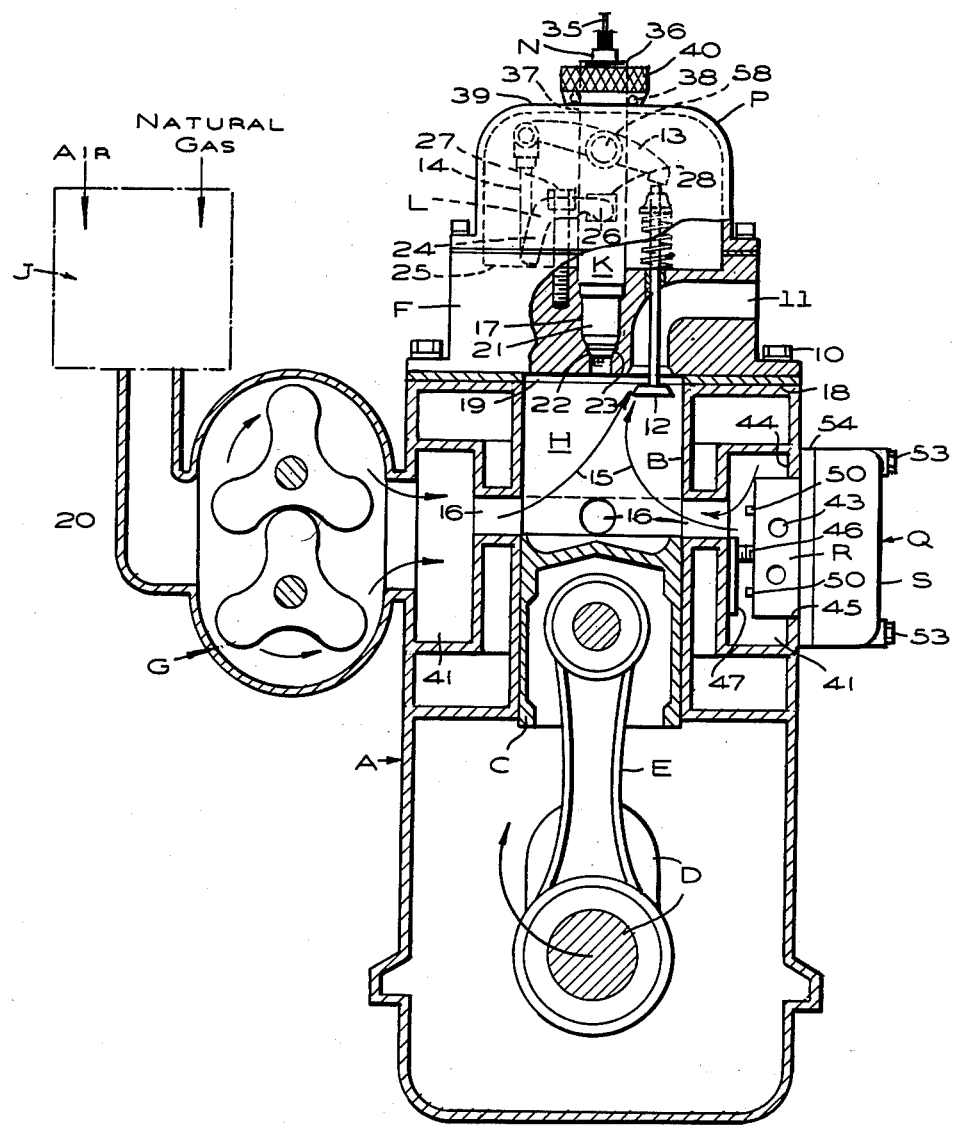
FIGURE 1 is a vertical transverse sectional view taken through a diesel engine that has been converted into a two-cycle gas engine, the supercharger blower being shown diagrammatically.

While we have shown only the preferred form of our invention, it should be understood that various changes, or modifications, may be made within the scope of the annexed claims without departing from the spirit thereof.

Detailed Description

Referring to the drawings in detail, we have shown a diesel engine in FIGURE 1, which defines an engine block A provided with a cylinder B in which a piston C is reciprocably mounted. Of course, any desired number of cylinders and corresponding pistons may be provided. As shown, the piston C is attached to a crankshaft D by a connecting rod E.

Moreover, a cylinder head F is secured by studs 10 to the engine block A. The head has been disclosed as having an exhaust port 11 provided with an exhaust valve 12. This exhaust valve may be opened at the proper time by a rocker arm 13 and push rod 14 to allow exhaust gas to be scavenged from the cylinder B, as suggested by the arrows 15.

The cylinder B has a series of inlet ports 16 positioned to be uncovered, when the piston C moves on its power stroke to a predetermined position in the cylinder. Also, a supercharger blower G communicates with the inlet ports 16. This blower is shown diagrammatically, and is provided as a part of a diesel engine to normally furnish air to the cylinder to scavenge the cylinder, and to provide air for being compressed when the piston moves upwardly.

Normally, a diesel fuel injector is mounted in a bore 17 which is dimensioned to receive such an injector. The compression ratio in a diesel engine is usually about 18:1, and shortly before the piston C reaches its highest point, the diesel fuel is sprayed into the combustion chamber H above the piston. The heat generated by the high compression of the air will ignite the fuel, forcing the piston C downwardly on its power stroke.

However, when operating the engine with air and natural gas, we have found that the compression ratio of 18:1 is too high, and there will be a premature explosion of the mixture of air and natural gas in the cylinder. Therefore, we have interposed a spacer 18 between the engine block A and the cylinder head F to thereby reduce the compression ratio to a point where the mixture of air and natural gas will not be pre-ignited in the cylinder B during the compression stroke of the piston C. This spacer will lengthen the combustion chamber, since the spacer has an aperture 19 therein that registers with the cylinder. We have found that a compression ratio of 8½:1 and up to 12:1 will be suitable, but we do not desire to be limited in this respect.

For the purpose of delivering a mixture of air and natural gas to the supercharger blower G, we have provided a carburetor J. In actual practice, about eleven parts of air are mixed with one part of natural gas.

This mixture is conveyed from the carbureter J to the supercharger blower G by a conduit 20.

With particular reference to FIGURES 1 to 3, inclusive, we have provided a spark-plug adapter tube K, the inner end section 21 of which is telescoped into the bore 17 of the cylinder head F. This tube is preferably made of stainless steel, but we do not desire to be limited in this regard. It will be observed that a conical seat 22 is provided at the bottom of the end section 21 so as to bear against a conical shoulder 23 fashioned in the bore 17 near the bottom of the latter. This shoulder is already provided in the bore 17 and against the usual fuel injector is seated, when the engine is being operated as a diesel. In other words, no change is required in the bore 17 when the spark-plug adapter tube K replaces the diesel fuel injector during the change-over from a diesel engine to a gas engine.

In FIGURES 1 and 2, we illustrate a hold-down clamp L that is provided for securing the usual diesel fuel injector in the bore 17. This clamp has an arm 24 at its lower end which is designed to rest on the recessed surface 25 of the cylinder head F, while the upper end of the clamp is fashioned with a yoke 26, the latter normally being used for engaging with the diesel fuel injector to secure the injector in place. A cap screw 27 extends through the hold-down clamp L and is threaded into the cylinder head F, this cap screw being provided on the diesel engine.

It will be noted that we have taken advantage of the hold-down clamp L and the cap screw 27 for anchoring the spark-plug adapter tube K in the bore 17. This feature is accomplished by providing notches 28 in opposite sides of the tube K and into which the yoke 26 extends.

Turning now to FIGURE 3, it will be apparent that the adapter tube K has a bore 29 extending lengthwise thereof. We have disclosed a spark plug M as being threaded into a reduced lower end portion 30 of the bore 29. Of course, the spark-plug is grounded to the tube K. An insulator tube N, preferably made of porcelain or ceramic, extends lengthwise of the bore 29, and has a bell-shaped lower end 31 that telescopes over the insulator stem 32 of the spark-plug. This stem carries the central terminal 33 of the spark-plug which is connected by a metal snap-on sleeve 34 to a rubber-covered electrical wire 35 that extends upwardly through the insulator tube N and beyond the adapter tube K. The tube N precludes the spark-plug from shorting to the tube K.

Any suitable means, such as a magneto or a generator distributor, may be employed for being connected to the wire 35 and igniting the compressed mixture of gas and natural gas in the compression chamber H at the proper time. In practice, the spark will occur when the crankshaft D is about 30° before top dead center.

As shown in FIGURE 1, a hood P is removably secured to the cylinder head F to enclose the exhaust valves 12 and the rocker arms 13 of the several cylinders. The spark-plug adapter tube K has its outer end section 36 extending through an opening 37 fashioned in the hood P, with the outer end section 36 projecting beyond the hood. A sealing ring 38 surrounds the outer projecting end section 36 of the adapter tube, with this sealing ring bearing against an exterior surface 39 of the hood. A hold-down nut 40 is threaded on the outer projecting end section 36 of the adapter tube K, and is adjustable to force the sealing ring 38 against the hood.

In order to prevent any accident in case of a backfire from the cylinder B into the supercharger blower G, we have provided a blower box pressure relief apparatus designated generally at Q in FIGURES 1, 4 and 5 of the drawings. The supercharger blower G includes a compartment 41 that surrounds the cylinder B and which communicates with the inlet ports 16, this being part of the diesel engine before being converted into a two-cycle gas engine.

In its structural features, the blower box pressure relief apparatus Q provides a hollow body R defining a chamber 42 on its interior. This hollow body is fashioned with openings 43 through which excess pressure may escape from the compartment 41 to the chamber 42, in case of a backfire into the supercharger blower G. The wall 44 of the compartment 41 is formed with an opening 45 through which the hollow body R projects (see FIGURE 1). A cap screw 46 extends through the hollow body R and is threaded into a boss 47 already provided on the interior of the compartment 41, thereby anchoring the hollow body R up against the wall 44.

Moreover, the hollow body R is formed with exhaust ports 48, each having a poppet valve 49 normally seated to close its respective exhaust port. The stems 50 of these valves extend through guides 51 provided on the interior of the hollow body R. Compression springs 52 are arranged in back of the valves 49 to resist unseating of the latter until the accidental backfire occurs. However, the valves 49 are movable in a direction to unseat, when the pressure in the chamber 42 reaches a predetermined amount, whereby the excess pressure may escape from the chamber 42.

In FIGURES 1, 4 and 5, we show a hollow cover S that is removably secured to the hollow body R to enclose the spring-loaded poppet valves 49. For this purpose, cap screws 53 extend through the cover S and are threaded into a flange 54 provided on the hollow body R. This cover has exhaust holes 55 leading from the interior 56 of the cover S to the atmosphere, and through which the excess pressure may escape during a backfire. The springs 52 are housed within the interior 56 of the cover S, and surround guide lugs 57 formed as part of this cover.

It will be appreciated, of course, that the carbureter J, spark-plug K and the blower box pressure relief apparatus Q may be easily removed. Thereupon, the usual diesel fuel injector may be reinstalled in the bore 17, using the same hold-down clamp L for holding the fuel injector in place, and a closure plate placed over the opening 45, this closure plate being provided on the diesel engine. Also, the spacer 18 must be removed, and a rocker arm (similar to 13) must be replaced on the rocker shaft 58 so as to operate the diesel fuel injector. When these steps have been accomplished, the engine may be operated again as a diesel.

We claim:

1. In a diesel engine converted into a two-cycle gas engine; an engine block provided with a cylinder having a piston reciprocably mounted therein; a compartment encircling the cylinder and having ports communicating with the cylinder; a supercharger blower communicating with the compartment; said compartment having an opening formed in a wall thereof; a blower box pressure relief apparatus having a hollow body portion mounted in the wall and projecting through said opening into said compartment; the hollow body defining a chamber in its interior; said body having at least one hole in a side thereof which projects into said compartment for communicating with the compartment interior when the hollow body is received in said wall opening; whereby any excessive pressure in the compartment can escape to the hollow body; said blower box apparatus having a cup-shaped cover for the hollow body; spring-loaded poppet valves normally closing passages between the hollow body interior and the cover interior; said cover having openings leading to the atmosphere for permitting excess pressure in the hollow body to open the valves and permit escape of excess pressure into the cover and thence through the cover openings to the atmosphere; and means for securing the apparatus to the engine block.

2. In a diesel engine converted into a two-cycle gas engine as defined in claim 1 wherein said securing means includes a threaded member extending through said body portion and engaging said engine block in said compartment.

References Cited in the file of this patent

UNITED STATES PATENTS

| | | |
|---|---|---|
| 884,853 | Radcliffe | Apr. 14, 1908 |
| 895,194 | Radcliffe | Aug. 2, 1908 |
| 2,232,841 | Dickson | Feb. 25, 1941 |
| 2,412,361 | Schreck | Dec. 10, 1946 |
| 2,525,131 | Hellett | Oct. 10, 1950 |
| 2,686,509 | Drinkard | Aug. 17, 1954 |
| 2,686,510 | Platner | Aug. 17, 1954 |
| 2,724,378 | Wellman | Nov. 22, 1955 |
| 2,997,038 | Peters | Aug. 22, 1961 |

FOREIGN PATENTS

| | | |
|---|---|---|
| 376,281 | Great Britain | July 4, 1932 |
| 556,790 | Great Britain | Oct. 21, 1943 |

OTHER REFERENCES

The Oil Engine and Gas Turbine, vol. XXII, No. 262, April 1955, p. 444.